Jan. 5, 1954   J. R. OISHEI   2,664,583
WINDSHIELD WIPING BLADE
Filed Sept. 10, 1949
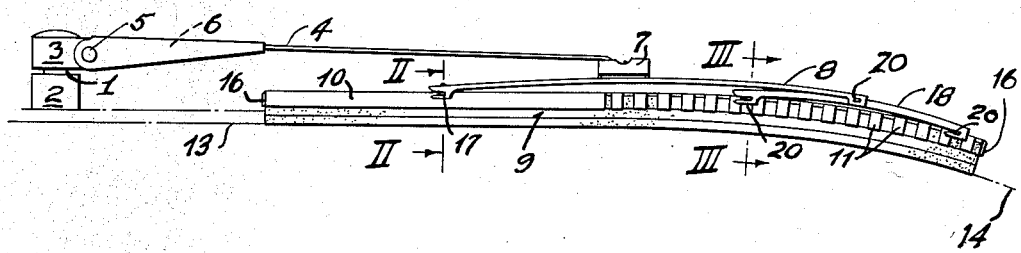
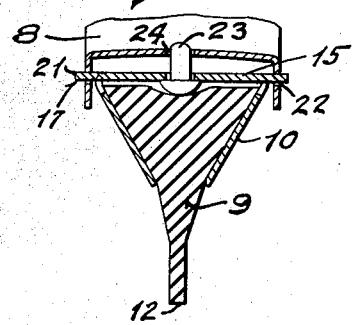   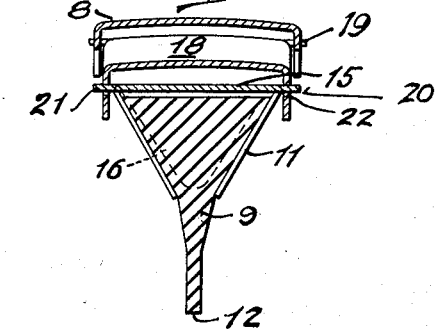
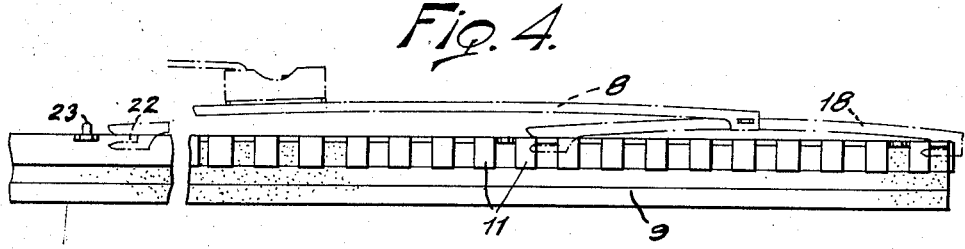
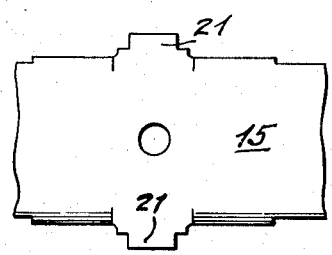
INVENTOR
John R. Oishei
BY
Bean, Brooks, Buckley & Bean.
ATTORNEYS Patented Jan. 5, 1954

2,664,583

UNITED STATES PATENT OFFICE 2,664,583

WINDSHIELD WIPING BLADE

John R. Oishei, Buffalo, N. Y., assignor to Trico Products Corporation, Buffalo, N. Y.

Application September 10, 1949, Serial No. 114,950

6 Claims. (Cl. 15—245)

This invention relates to the windshield cleaning art and more particularly to a wiper for curved windshields. Curved windshields frequently have substantially flat areas along their lower margins for better vision immediately to the front of the vehicle. Consequently, the windshield wiper, which is journaled or pivoted to swing about an axis adjacent the cowl, must have its outer end quite flexible for conforming to the greater curvature further removed from the axis of wiper movement and especially toward the sides of the vehicle. An advantage in cleaning flat surfaces over curved ones is that for the former the wiper is provided with a rigid backing by which the wiping arm pressure is more uniformly distributed throughout the length of the wiping edge while for a curved surface wiper the wiping edge is given a flexible or yielding suspension between spaced points of support for more ready conformance to the surface curvature.

The primary object of the present invention is to provide a wiper which will give maximum efficiency in the cleaning of windshields of this character toward the maintenance of a clear field of vision.

A further object of the invention is to provide a wiper having a continuous wiping edge supported by a backing so designed as to secure the best performance in cleaning the adjoining flat and curved surfaces of a windshield.

The invention further resides in an improved wiper by which the arm pressure is more effectively distributed to the active portions of the wiper over its entire length for maintaining a clear field of vision.

The foregoing and other objects will manifest themselves as the following description progresses, reference being had to the accompanying drawings, wherein Fig. 1 is a side elevation showing a practical application of the present invention;

Figs. 2 and 3 are cross sectional views taken about on lines 2—2 and 3—3, respectively, of Fig. 1;

Fig. 4 is a fragmentary side elevation more clearly depicting the improved wiper; and Fig. 5 is a detailed plan view of the portion of the wiper backing.

Referring more particularly to the drawing, the numeral 1 designates an oscillatory drive shaft which is journaled in a support 2 and carries on its outer end a wiper actuating arm having a mounting section 3 and a blade carrying section 4 pivotally connected by a pivot 5, with a spring 6 urging the outer section 4 and its carried wiper toward the windshield, all in a well known manner. The outer end of the arm is detachably connected by an attaching clip 7 to a primary pressure-distributing member 8 which in turn is connected to the blade or wiper.

The wiper comprises a flexible squeegee body 9, preferably of elastic material, and a channeled holder therefor which has a rigid inner section and a flexible outer section. This semi-rigid and semi-flexible holder loosely receives the elastic body for lateral rocking therein and provides a backing for the wiping edge 12 of the body 9 which is coextensive therewith for giving surface-conforming support thereto when the wiper is operatively engaged with the substantially flat portion 13 and the curved portion 14 of the windshield.

The cross sectional shape of the channeled holder affords a broad flat bottom wall 15 with converging side walls. Each side wall has a solid flange 10, giving rigidity to the inner section, and a series of spaced-apart fingers 11, imparting flexibility to the outer section. The side flanges 10 and the spaced fingers 11 are designed to loosely embrace the rubber or elastic body 9 to permit the latter rocking within its holder to a limited extent. The strip-like bottom wall 15 may be of uniform thickness throughout, or its outer end portion may be slightly thinner for increasing its flexibility, as shown in Figs. 2 and 3. The opposite ends of the strip may be turned down to form stop projections 16 for retaining the loosely held wiper body within its combined rigid and flexible holder.

The rigid inner portion of the blade is pivotally or loosely connected to the adjacent end of the pressure distributing member 8 in a suitable manner, as indicated at 17, while the opposite end of the pressure distributing member is rockably connected to the flexible outer portion of the blade by an interposed secondary pressure distributing member 18, which latter is rockable at 19 on the adjacent end of the primary member and has its opposite ends flexibly connected to the curvature-conforming portion of the backing at the longitudinally spaced points 20. The mode of making these connections to the composite backing is herein illustrated as being detachable and comprises pairs of oppositely extending ears or lugs 21 on the backing strip 15 for slidably engaging in the seats 22 provided on the inner end of the pressure distributing member 8 and on the opposite ends of the secondary member 18. The engagement is secured by means of a lock pin 23 backed by the rubber body 9 and upstanding from the backing strip to enter a recess 24 in the primary member 8.

By reason of the direct connection of the primary member 8 to the rigid inner portion of the blade, the arm pressure will be uniformly distributed throughout the length of such rigid section. While by reason of the rockable support 18 the flexible portion will be suspended by and between the spaced ends of the secondary member 18 as well as by the adjacent end of the rigid section. The secondary member will serve to distribute the wiper arm pressure to these points of suspension and cause the outer portion of the blade to flex in conformance to the surface curvature.

The flat surface 13 will therefore be given a uniform wiping action throughout while the curved surface 14 will have its wiping edge suspended at longitudinally spaced points for maintaining wiping contact throughout surface contour changes.

The foregoing description has been given in detail without thought of limitation since the inventive principles involved are capable of assuming other physical embodiments without departing from the spirit of the invention and the scope of the appended claims.

What is claimed is:

1. A windshield wiper comprising an elongate flexible body having a wiping edge, a flexible backing therefor loosely supporting the same to facilitate the conformance of the wiping edge to the surface being wiped, an arm-pressure distributing member extending lengthwise of the body, a second member extending lengthwise of the body beneath one end of the first member and pivotally connected thereto for distributing the arm pressure as transmitted to it by said one end, the opposite ends of the second member being connected to the backing at longitudinally spaced points, said first member having its opposite end directly connected to the backing at a point spaced longitudinally from the aforesaid second member, and means provided on said first member for attaching it to an actuating arm.

2. A wiper for a curved windshield, comprising an elongate flexible body, a backing therefor having one end portion rigid and the opposite end portion flexible, and a pressure distributing member extending lengthwise of the body and having an arm attaching means intermediate its length with one end of the member directly connected to the rigid end portion and the opposite end of the member indirectly connected to the flexible end portion by an interposed member which extends lengthwise of the pressure distributing member and is rockably connected intermediate its ends to the distributing member, said interposed member having its opposite ends pivotally connected to such flexible end portion at longitudinally spaced points.

3. A windshield wiper comprising an elongate flexible body, a backing therefor coextensive therewith and having a rigid end portion and an adjoining flexible end portion, and a pressure distributing member extending lengthwise of the body and having means intermediate its length for attachment to an actuating arm, means connecting one end of the member to the rigid end portion intermediate its ends, and a second elongated member rockably connected intermediate its ends to the opposite end of the distributing member, the second member being flexibly connected to the flexible end portion at longitudinally spaced points for giving it a surface conforming suspension thereon.

4. A windshield wiper comprising an elongate flexible body, a backing therefor, and a pressure distributing member extending lengthwise of the body and having one end directly connected to the backing and its opposite end indirectly connected thereto through an elongate secondary pressure distributing member which is pivotally connected intermediate its ends to the opposite end of the first pressure distributing member and in turn has its opposite ends connected to the backing at longitudinally spaced points for rockably supporting the same on the first pressure distributing member.

5. A wiper for a curved windshield having a substantially flat part, comprising an elongate flexible body, a backing therefor having a rigid portion and an adjoining flexible portion which latter serves to flex the body from the point of juncture with the rigid portion, a primary pressure distributing member extending lengthwise of the body and having an arm attaching means intermediate its length, with one end of the member connected to the rigid portion, and a secondary pressure distributing member also extending lengthwise of the body and rockable upon the opposite end of the primary member and itself having connection to the flexible portion at longitudinally spaced points for giving it a surface conforming suspension thereto, said backing having an elongate body with rigid channel forming sides for part way of its length and opposed series of longitudinally spaced fingers for the remainder of its length for constituting the rigid and the flexible portions respectively.

6. A windshield wiper comprising an elongate flexible body, a backing therefor coextensive therewith and having a rigid channeled end portion and an adjoining flexible end portion, and a pressure distributing member extending lengthwise of the body and having means intermediate its length for attachment to an actuating arm, means connecting one end of the member to the rigid end portion of the backing intermediate its ends, and other means flexibly connecting the other end of the member to the flexible end portion of the backing for giving it a surface conforming suspension thereon.

JOHN R. OISHEI.

References Cited in the file of this patent

UNITED STATES PATENTS

| Number | Name | Date |
| --- | --- | --- |
| 1,498,155 | Dorr | June 17, 1924 |
| 1,694,245 | Baker | Dec. 4, 1928 |
| 2,128,454 | Cullin | Aug. 30, 1938 |
| 2,257,789 | Hoffmann | Oct. 7, 1941 |

FOREIGN PATENTS

| Number | Country | Date |
| --- | --- | --- |
| 595,876 | Great Britain | Dec. 19, 1947 |